United States Patent [19]

Basista

[11] 4,303,312
[45] Dec. 1, 1981

[54] PHOTOGRAPHIC OBJECTIVE OF CONTINUOUSLY VARIABLE FOCAL LENGTH

[75] Inventor: Heinrich Basista, Königsbronn, Fed. Rep. of Germany

[73] Assignee: Carl Zeiss-Stiftung, Fed. Rep. of Germany

[21] Appl. No.: 112,045

[22] Filed: Jan. 14, 1980

[30] Foreign Application Priority Data

Jan. 12, 1979 [DE] Fed. Rep. of Germany ....... 2900977

[51] Int. Cl.³ .............................................. G02B 15/18
[52] U.S. Cl. ................................................... 350/427
[58] Field of Search ................................ 350/427, 428

[56] References Cited

U.S. PATENT DOCUMENTS

| | | | |
|---|---|---|---|
| 3,464,763 | 9/1969 | Berger | 350/427 |
| 3,817,600 | 6/1974 | Watanabe | 350/428 |
| 3,997,244 | 12/1976 | Takano | 350/427 |

*Primary Examiner*—Conrad J. Clark

*Attorney, Agent, or Firm*—Stonebraker, Shepard & Stephens

[57] ABSTRACT

A photographic objective of continuously variable focal length, having four groups of lens members. The first group is of converging refractive power, the second and third of diverging, and the fourth of converging refractive power. Change in focal length is effected by axial displacement of the second and third groups relative to each other and to the first and fourth groups. The refractive powers of the movable second and third groups are so distributed that the variable air space between the third and fourth groups is larger in the wide angle position than in any other focal length position and is smaller by a factor of 0.3 than the shortest focal length of the objective. The fourth group contains in the front part lens members which include at least one laminated member with a cemented surface of negative refractive power, followed at a distance by a diverging meniscus whose concave surface faces rearwardly toward the image plane and whose focal length is larger by a factor of at last three and not more than five times the longest focal length of the objective.

3 Claims, 2 Drawing Figures

PHOTOGRAPHIC OBJECTIVE OF CONTINUOUSLY VARIABLE FOCAL LENGTH

This invention relates to photographic objectives of continuously variable focal length, consisting of four lens groups the first of which (A) is of converging, the second (B) of diverging, the third (C) of diverging and the fourth (D) of converging refractive power, the change in the focal length of the lens being effected in the manner that the two diverging lens groups (B,C) are displaced along the optical axis relative to each other and relative to the two converging lens groups (A and D), the two diverging lens groups (B, C) together consisting of at least four members at least one of which members has a chromatically acting cemented surface.

A photographic objective of continuously variable focal length is known, for instance, under the name of Vario-Sonnar 4/85-250 and from German Pat. No. 1447293. This known objective, however, is of cumbersomely large outside dimensions with a front lens diameter of 68.4 mm and a structural length (L+S) of 300.73 mm.

The object of the present invention is to provide an objective of variable focal length for the miniature film size of 24×36 mm$^2$, the focal lengths of which extend from the lower up into the middle telephoto range and which furthermore has small dimensions, in particular a small front-lens diameter, a short structural length and a low weight.

This object is achieved in accordance with the invention by an optical system which is of completely new construction as compared with the prior art and which is characterized by the fact that the fourth multilens lens group (D) contains within the front part, consisting of the lenses IX and XIII, at least one laminated member whose cemented surface is of negative refractive power, and that this laminated member is followed at a distinct distance by a diverging meniscus (lens XIII) whose concave surface is curved towards the image plane and whose focal length is greater in amount by at least a factor of 3 and at most a factor of 5 than the longest focal length of the entire system, and that the refractive powers of the movable lens groups (B, C) are so distributed that the variable air space ($d_{14}$) is greatest in the wide-angle position than in any other focal length position and is smaller in amount by a factor of 0.3 than the shortest focal length of the entire system.

The diverging meniscus contributes in particular to reducing the zonal aberration and to shortening the structural length.

The first converging lens group of the objective preferably is formed predominantly of two members only the first of which contains a chromatically acting cemented surface while the fourth converging lens group is of multilens construction and has at least one laminated member whose cemented surface is of negative refractive power. One illustrative embodiment of the invention which is corrected for an aperture of f: 3.5 is indicated in the following data table.

Data Table

| Lens | Radii | Vertex distance | Refractive index $n_d$ | Abbe No. for the d-line $v_d$ |
|---|---|---|---|---|
| I | $r_1 = +89.123$ | | | |
| | | $d_1 = 3.8$ | 1.80517 | 25.43 |
| II | $r_2 = +53.858$ | | | |
| | | $d_2 = 7.8$ | 1.51680 | 64.17 |
| | $r_3 = +199.522$ | | | |
| | | $d_3 = 0.1$ | | |
| III | $r_4 = +81.163$ | | | |
| | | $d_4 = 7.0$ | 1.52341 | 51.49 |
| | $r_5 = -956.760$ | | | |
| | | $d_5 = \begin{matrix}(1.200)\\31.370\\(48.326)\end{matrix}$ | | |
| IV | $r_6 = -446.700$ | | | |
| | | $d_6 = 1.6$ | 1.69100 | 54.71 |
| | $r_7 = +31.851$ | | | |
| | | $d_7 = 5.5$ | | |
| V | $r_8 = -125.885$ | | | |
| | | $d_8 = 2.5$ | 1.69100 | 54.71 |
| | $r_9 = +112.204$ | | | |
| | | $d_9 = 1.4$ | | |
| | $r_{10} = +50.844$ | | | |
| VI | | $d_{10} = 4.8$ | 1.67270 | 32.21 |
| | $r_{11} = -260.600$ | | | |
| | | $d_{11} = \begin{matrix}(35.672)\\9.145\\(2.400)\end{matrix}$ | | |
| VII | $r_{12} = -66.834$ | | | |
| | | $d_{12} = 1.8$ | 1.69100 | 54.71 |
| VIII | $r_{13} = +51.958$ | | | |
| | | $d_{13} = 4.5$ | 1.68893 | 31.18 |
| | $r_{14} = +3073.000$ | | | |
| | | $d_{14} = \begin{matrix}(17.054)\\13.411\\(3.200)\end{matrix}$ | | |
| IX | $r_{15} = +118.844$ | | | |
| | | $d_{15} = 5.2$ | 1.61272 | 58.63 |
| | $r_{16} = -93.056$ | | | |
| | | $d_{16} = 0.1$ | | |
| X | $r_{17} = +78.861$ | | | |
| | | $d_{17} = 4.8$ | 1.55232 | 63.46 |
| | $r_{18} = -370.550$ | | | |
| | | $d_{18} = 0.1$ | | |
| XI | $r_{19} = +52.703$ | | | |
| | | $d_{19} = 6.8$ | 1.48749 | 70.41 |
| XII | $r_{20} = -98.572$ | | | |
| | | $d_{20} = 2.7$ | 1.80518 | 25.43 |
| | $r_{21} = +118.844$ | | | |
| | | $d_{21} = 28.0$ | | |
| XIII | $r_{22} = +39.809$ | | | |
| | | $d_{22} = 2.6$ | 1.54814 | 45.75 |
| | $r_{23} = +35.737$ | | | |
| | | $d_{23} = 23.4$ | | |
| XIV | $r_{24} = +84.744$ | | | |
| | | $d_{24} = 4.0$ | 1.54814 | 45.75 |
| | $r_{25} = -147.480$ | | | |
| | | $d_{25} = 3.7$ | | |
| XV | $r_{26} = -35.479$ | | | |
| | | $d_{26} = 2.5$ | 1.61765 | 55.14 |
| | $r_{27} = -125.885$ | | | |

Back focus s' = 49.18

The advantages obtained with the invention reside in particular in the fact that for the picture size of 24×36 mm$^2$ there has been created a pancratic objective which obtains an extension range of $\geq 70$ f $\geq 210$ mm, whose focal lengths therefore extend from the lower into the middle telephoto range. Further advantages consist of its small dimensions, particularly the small front lens diameter of 56 mm and the short structural length (L+S) of 227.87 mm as well as its low weight.

One illustrative embodiment of the invention is shown in the drawing and will be described in further detail below.

Figure 1:
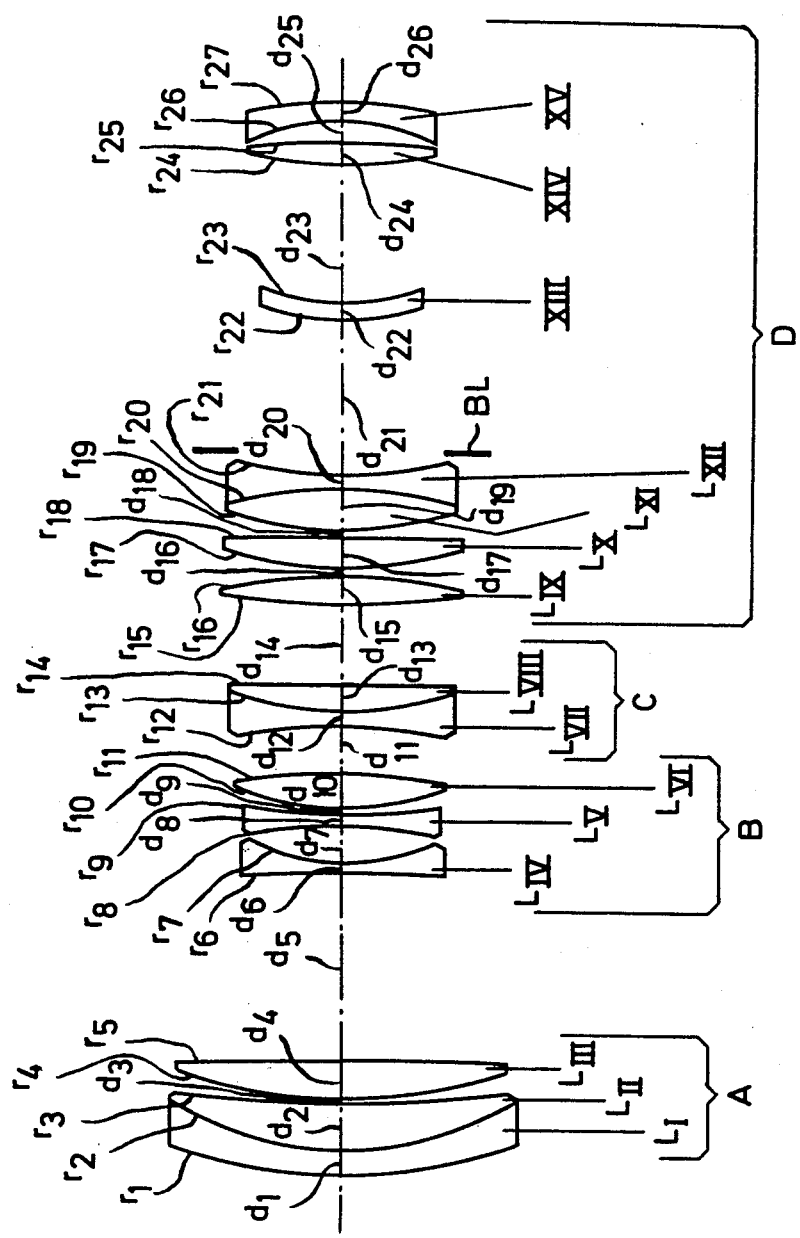
FIG. 1 is a sectional view of the objective according to the invention.
Figure 2:
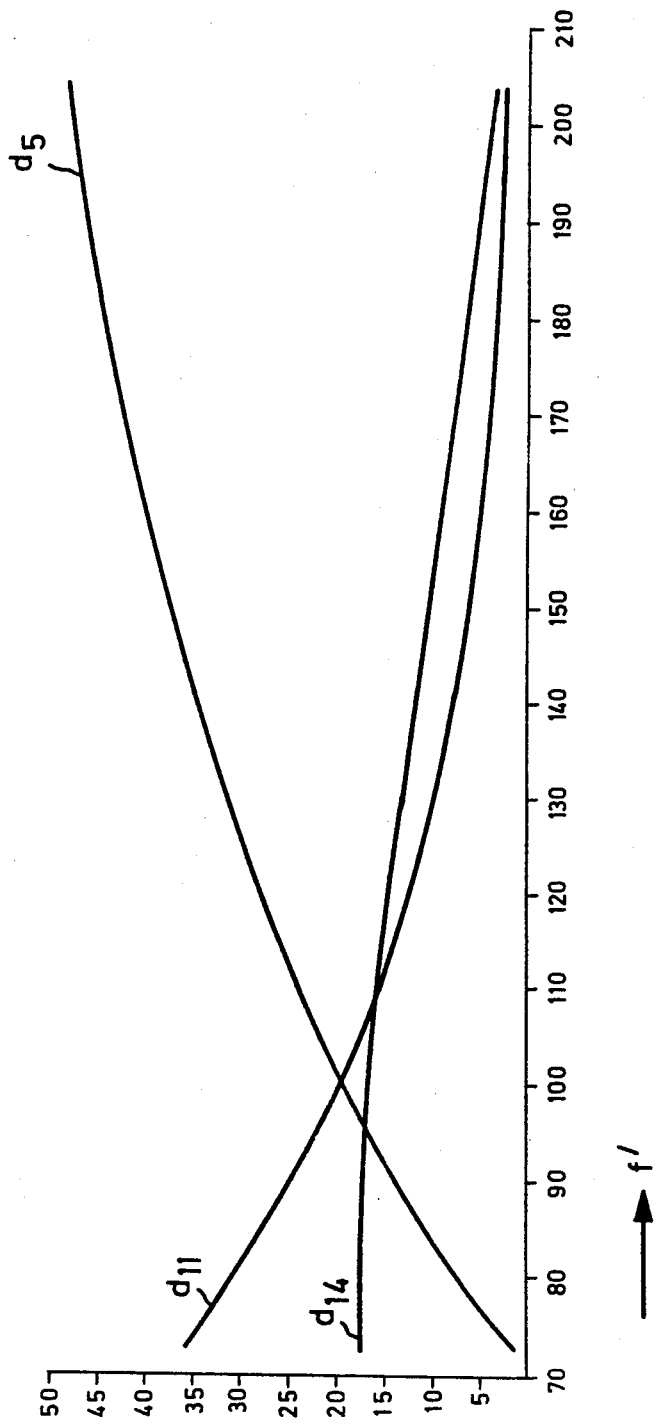
FIG. 2 is a view of the variable air spaces of the objective of the invention as a function of the focal lengths.

In the sectional view of FIG. 1 the individual lenses are numbered continuously from I to XV. r are the radii and d the vertex distances.

The values given in the Data Table for the variable air spaces $d_5$, $d_{11}$ and $d_{14}$ refer to the different positions of the corresponding members for the different focal lengths of the objective.

| $d_5$ | $d_{11}$ | $d_{14}$ | |
|---|---|---|---|
| 1.200 | 35.672 | 17.054 | $f_1 = 72.15$ |
| 31.370 | 9.145 | 13.411 | $f_2 = 130.17$ |
| 48.326 | 2.400 | 3.200 | $f_3 = 203.20$ |

The focal lengths of the individual lens groups have the following values:

| | |
|---|---|
| $f_A = +125.025$ | $L_1-L_3$ |
| $f_B = -58.190$ | $L_4-L_6$ |
| $f_C = -94.231$ | $L_7-L_8$ |
| $f_D = +43.579$ | $L_9-L_{15}$ |

Objectives whose manufacturing data do not agree completely with the data of the example of the invention described should—in order to assure a uniformly good state of correction—have their manufacturing data adapted to the data indicated to such an extent that none of the surface refractive powers (n/r) differ in amount from the value indicated in the data table by more than $$0.10 \times \frac{1}{f_A},$$

in which $f_A$ is the focal length of the converging first lens group (A).

I claim:

1. Photographic objectives of continuously variable focal length, consisting of four lens-groups the first of which (A) is of converging, the second (B) of diverging, the third (C) of diverging, and the fourth (D) of converging refractive power, the change in the focal length of the objective being effected in the manner that the two diverging lens groups (B,C) are displaced along the optical axis relative to each other and relative to the two converging lens groups (A,D), the two diverging lens groups (B,C) consisting together of at least four members at least one of which members has a chromatically acting cemented surface, characterized by the fact that the refractive powers of the movable lens groups (B,C) are so distributed that the variable air space ($d_{14}$) present between the lens groups (C) and (D) is larger in the wide-angle position than in any other focal-length postion and is smaller in amount by a factor of 0.3 than the shortest focal length ($f_1$) of the objective, and that the fourth multilens lens group (D) contains in the front part, consisting of the lenses IX to XII at least one laminated member whose cemented surface is of negative refractive power, and that this laminated member is followed, at a distinct distance from it, by a diverging meniscus (lens XIII) whose concave surface is curved towards the image plane and whose focal length is larger in amount by at least a factor of 3 and at most a factor of 5 than the longest focal length ($f_3$) of the objective.

2. Photographic objectives in accordance with claim 1, characterized by the fact that the first converging lens group (A) consists of two members only the first of which contains a chromatically acting cemented surface, and that the fourth converging lens group (D) is of multilens constructions and has at least one laminated member whose cemented surface is of negative refractive power.

3. A photographic objective according to claim 1, characterized by the data contained in the following table:

| | | Data Table | | |
|---|---|---|---|---|
| Lens | Radii | Vertex distance | Refractive index $n_d$ | Abbe No. for the d-line $\nu_d$ |
| I | $r_1 = +89.123$ | | | |
| | | $d_1 = 3.8$ | 1.80517 | 25.43 |
| II | $r_2 = +53.858$ | | | |
| | | $d_2 = 7.8$ | 1.51680 | 64.17 |
| | $r_3 = +199.522$ | | | |
| | | $d_3 = 0.1$ | | |
| III | $r_4 = +81.163$ | | | |
| | | $d_4 = 7.0$ | 1.52341 | 51.49 |
| | $r_5 = -956.760$ | | | |
| | | (1.200) | | |
| | | $d_5 = 31.370$ | | |
| | | (48.326) | | |
| IV | $r_6 = -446.700$ | | | |
| | | $d_6 = 1.6$ | 1.69100 | 54.71 |
| | $r_7 = +31.851$ | | | |
| | | $d_7 = 5.5$ | | |
| V | $r_8 = -125.885$ | | | |
| | | $d_8 = 2.5$ | 1.69100 | 54.71 |
| | $r_9 = +112.204$ | | | |
| | | $d_9 = 1.4$ | | |
| | $r_{10} = +50.844$ | | | |
| VI | | $d_{10} = 4.8$ | 1.67270 | 32.21 |
| | $r_{11} = -260.600$ | | | |
| | | (35.672) | | |
| | | $d_{11} = 9.145$ | | |

(Groups: A spans lenses I–III, B spans lenses IV–VI)

-continued
Data Table

| Lens | Radii | Vertex distance | Refractive index $n_d$ | Abbe No. for the d-line $\nu_d$ | |
|---|---|---|---|---|---|
| | | (2.400) | | | |
| VII | $r_{12} = -66.834$ | | | | |
| | | $d_{12} = 1.8$ | 1.69100 | 54.71 | |
| VIII | $r_{13} = +51.958$ | | | | C |
| | | $d_{13} = 4.5$ | 1.68893 | 31.18 | |
| | $r_{14} = +3073.000$ | | | | |
| | | (17.054) | | | |
| | | $d_{14} = 13.411$ | | | |
| | | (3.200) | | | |
| IX | $r_{15} = +118.844$ | | | | |
| | | $d_{15} = 5.2$ | 1.61272 | 58.63 | |
| | $r_{16} = -93.056$ | | | | |
| | | $d_{16} = 0.1$ | | | O |
| X | $r_{17} = +78.861$ | | | | |
| | | $d_{17} = 4.8$ | 1.55232 | 63.46 | |
| | $r_{18} = -370.550$ | | | | |
| | | $d_{18} = 0.1$ | | | |
| XI | $r_{19} = +52.703$ | | | | |
| | | $d_{19} = 6.8$ | 1.48749 | 70.41 | |
| XII | $r_{20} = -98.572$ | | | | |
| | | $d_{20} = 2.7$ | 1.80518 | 25.43 | |
| | $r_{21} = +118.844$ | | | | |
| | | $d_{21} = 28.0$ | | | |
| XIII | $r_{22} = +39.809$ | | | | |
| | | $d_{22} = 2.6$ | 1.54814 | 45.75 | |
| | $r_{23} = +35.737$ | | | | D |
| | | $d_{23} = 23.4$ | | | |
| XIV | $r_{24} = +84.744$ | | | | |
| | | $d_{24} = 4.0$ | 1.54814 | 45.75 | |
| | $r_{25} = -147.480$ | | | | |
| | | $d_{25} = 3.7$ | | | |
| XV | $r_{26} = -35.479$ | | | | |
| | | $d_{26} = 2.5$ | 1.61765 | 55.14 | |
| | $r_{27} = -125.885$ | | | | |

Back focus s' = 49.18